(12) United States Patent
Sato et al.

(10) Patent No.: US 11,722,621 B2
(45) Date of Patent: Aug. 8, 2023

(54) IMAGE FORMING APPARATUS

(71) Applicant: CANON KABUSHIKI KAISHA, Tokyo (JP)

(72) Inventors: Masaki Sato, Kawasaki (JP); Akira Yoshimura, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 95 days.

(21) Appl. No.: 17/013,927

(22) Filed: Sep. 8, 2020

(65) Prior Publication Data
US 2021/0084189 A1 Mar. 18, 2021

(30) Foreign Application Priority Data
Sep. 12, 2019 (JP) .................. 2019-166461

(51) Int. Cl.
*H04N 1/047* (2006.01)
*G03G 15/00* (2006.01)
*G03G 21/16* (2006.01)

(52) U.S. Cl.
CPC ......... *H04N 1/047* (2013.01); *G03G 15/6502* (2013.01); *G03G 21/1619* (2013.01); *G03G 2215/00303* (2013.01); *H04N 2201/04741* (2013.01)

(58) Field of Classification Search
CPC ...... B65H 1/266; B65H 2220/01; B65H 1/04; B65H 2220/04; G03G 15/6502; G03G 15/6511
See application file for complete search history.

(56) References Cited

U.S. PATENT DOCUMENTS

| 5,331,374 A | * | 7/1994 | Abe ..................... G03G 21/185 |
| | | | 399/130 |
| 7,177,566 B2 | * | 2/2007 | Noda ................. G03G 21/1619 |
| | | | 399/110 |
| 8,849,178 B2 | | 9/2014 | Yoshimura et al. |
| 9,428,353 B2 | | 8/2016 | Obara |
| (Continued) |

FOREIGN PATENT DOCUMENTS

| EP | 2644540 A2 | 10/2013 |
| JP | H08-040573 A | 2/1996 |
| (Continued) |

OTHER PUBLICATIONS

Great Britain Search Report dated Mar. 9, 2021, in related Great Britain Application No. 2014110.7.

*Primary Examiner* — Jessica L Eley
(74) *Attorney, Agent, or Firm* — Venable LLP (57) ABSTRACT

An image forming apparatus includes an apparatus body, a sheet supporting portion, a sheet feeding portion configured to feed a sheet supported on the sheet supporting portion, a sheet regulation portion configured to regulate a position of the sheet in a width direction, an image forming portion including an exposing portion configured to expose a charged surface of an image bearing member, the image forming portion being configured to form an image on the sheet fed by the sheet feeding portion, and a frame member provided inside the apparatus body. A position of the exposing portion is determined with respect to the frame member. A position of the sheet regulation portion is determined with respect to the frame member.

13 Claims, 7 Drawing Sheets

(56) References Cited

U.S. PATENT DOCUMENTS

| | | | |
|---|---|---|---|
| 9,815,640 B2 | 11/2017 | Obara | |
| 2010/0014887 A1* | 1/2010 | Tomatsu | G03G 21/1864 |
| | | | 399/107 |
| 2015/0293490 A1 | 10/2015 | Obara | |
| 2016/0046457 A1* | 2/2016 | Ishikawa | B65H 1/266 |
| | | | 271/265.01 |
| 2016/0244285 A1* | 8/2016 | Yamamoto | B65H 1/04 |
| 2016/0272441 A1 | 9/2016 | Okamoto et al. | |
| 2016/0327897 A1* | 11/2016 | Kondo | G03G 15/6529 |
| 2016/0332830 A1 | 11/2016 | Obara | |
| 2017/0057767 A1* | 3/2017 | Ishida | B65H 1/04 |
| 2017/0275114 A1* | 9/2017 | Matsui | B65H 1/08 |
| 2018/0004145 A1* | 1/2018 | Sato | G03G 15/6552 |

FOREIGN PATENT DOCUMENTS

| | | |
|---|---|---|
| JP | H09-188424 A | 7/1997 |
| JP | 2001-100494 A | 4/2001 |
| JP | 2005-219874 A | 8/2005 |
| JP | 2006-282362 A | 10/2006 |
| JP | 2013-133206 A | 7/2013 |
| JP | 2015-212204 A | 11/2015 |

\* cited by examiner

IMAGE FORMING APPARATUS

BACKGROUND OF THE INVENTION

Field of the Invention

The present invention relates to an image forming apparatus that forms an image on a sheet.

Description of the Related Art

Conventionally, as disclosed in Japanese Patent Laid-Open Publication No. 2005-219874, an image forming apparatus, in which the position of a sheet supported on a sheet supporting surface of a sheet feeding apparatus in a width direction is regulated by a pair of guide members, is proposed. The pair of guide members are each provided with a rack, and these racks coordinate with each other via a pinion supported by a top plate portion opposing the sheet feeding apparatus.

In the image forming apparatus disclosed in Japanese Patent Laid-Open Publication No. 2005-219874 described above, the position of the sheet supported on the sheet supporting surface in the width direction is regulated by the guide members described above, and thus the position of the sheet and a toner image formed on an image bearing member in the width direction are aligned.

However, in the case where the relative positions of the guide member and an exposing unit that exposes the image bearing member are deviated from each other, the toner image transferred onto the sheet is displaced in the width direction with respect to the sheet no matter how much the position of the sheet in the width direction is regulated by the guide members.

SUMMARY OF THE INVENTION

According to one aspect of the present invention, an image forming apparatus includes an apparatus body, a sheet supporting portion configured to support a sheet thereon, a sheet feeding portion configured to feed the sheet supported on the sheet supporting portion, a sheet regulation portion configured to regulate a position of the sheet supported on the sheet supporting portion in a width direction perpendicular to a feeding direction in which the sheet is fed, an image forming portion including an image bearing member configured to rotate, a charging portion configured to charge a surface of the image bearing member, an exposing portion configured to expose the charged surface of the image bearing member to form an electrostatic latent image, and a developing portion configured to develop the electrostatic latent image formed on the image bearing member with toner, the image forming portion being configured to form an image on the sheet fed by the sheet feeding portion, and a frame member provided inside the apparatus body. A position of the exposing portion is determined with respect to the frame member. A position of the sheet regulation portion is determined with respect to the frame member.

Further features of the present invention will become apparent from the following description of exemplary embodiments with reference to the attached drawings.

DESCRIPTION OF THE EMBODIMENTS

Embodiments of the present invention will be described below with reference to drawings. To be noted, the dimensions, materials, shapes, and relative positions of constituent parts described in the embodiments should be appropriately modified in accordance with various conditions and the configuration of the apparatus to which the invention is applied. That is, the scope of this invention is not limited to the embodiments described below.

First Embodiment

Overall Configuration

Figure 1:
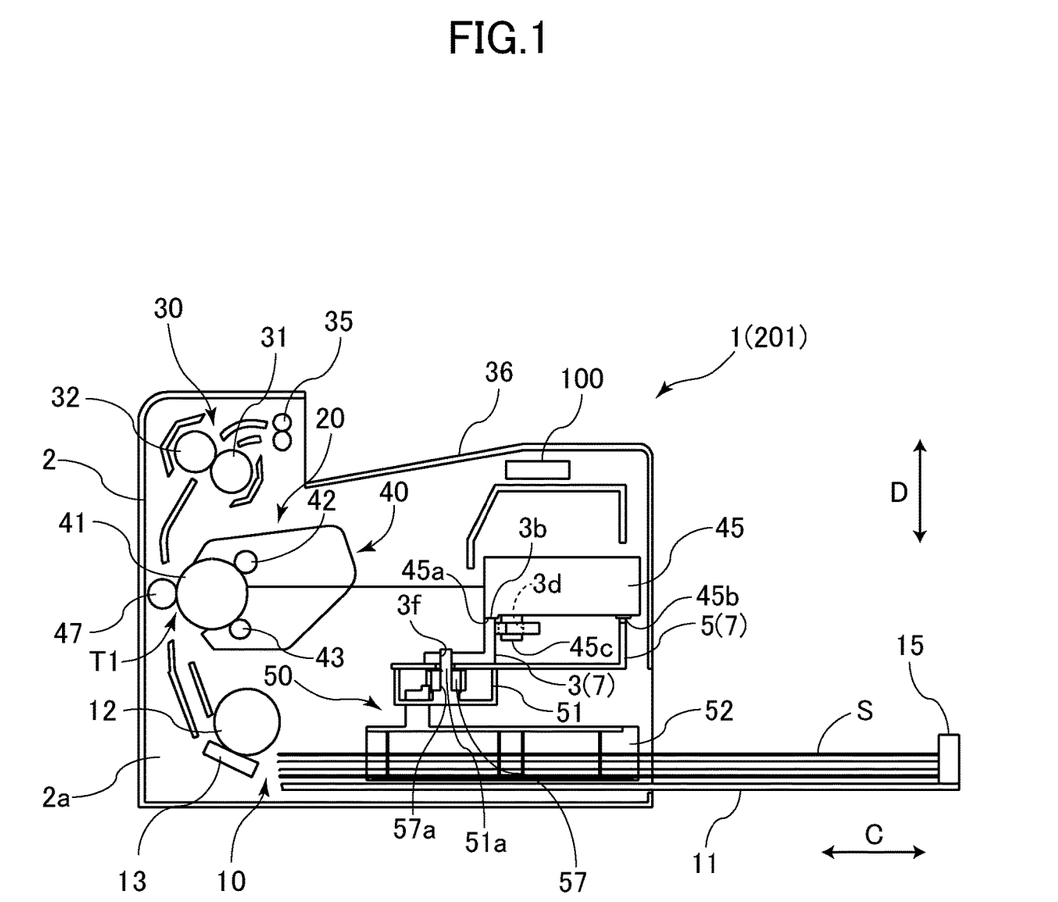
FIG. 1 is an overall schematic view of a printer according to a first embodiment.

A printer 1 serving as an image forming apparatus according to a first embodiment is a laser beam printer of an electrophotographic system that forms a monochromatic toner image on a sheet. As illustrated in FIG. 1, the printer 1 includes a printer body 2 serving as an apparatus body, a sheet feeding apparatus 10 that feeds a sheet S, an image forming portion 20 that forms an image on the sheet S fed by the sheet feeding apparatus 10, a fixing unit 30, a discharge roller pair 35, and a controller 100.

The image forming portion 20 described above includes a process cartridge 40, a laser scanner 45 serving as an exposing portion, and a transfer roller 47. The process cartridge 40 includes a photosensitive drum 41 configured to rotate and serving as an image bearing member, and includes a charging roller 42 serving as a charging portion, a developing roller 43 serving as a developing portion, and so forth around the photosensitive drum 41.

When an image formation job is input to the printer 1 from an external computer or the like, the controller 100 controls the laser scanner 45 to expose the surface of the photosensitive drum 41 uniformly charged by the charging roller 42, and thus an electrostatic latent image corresponding to input image information is formed. This electrostatic latent image is developed with toner by the developing roller 43, and thus a monochromatic toner image is formed on the photosensitive drum 41.

In addition, a sheet is fed from the sheet feeding apparatus 10 toward the image forming portion 20 in parallel with the image forming process described above. Specifically, a feed roller 12 serving as a sheet feeding portion starts rotating at a predetermined timing, thus one sheet S between the feed roller 12 and a separation pad 13 is separated and fed from sheets S on a feed tray 11, and the sheet S is conveyed to a transfer nip T1 between the photosensitive drum 41 and the transfer roller 47. In the transfer nip T1, a transfer bias is applied to the transfer roller 47, and thus the toner image on the photosensitive drum 41 is transferred onto the sheet S.

The sheet S onto which the toner image has been transferred in the transfer nip T1 described above is heated and pressurized by a heating roller 31 and a pressurizing roller 32 of the fixing unit 30, and thus the toner image is fixed onto the sheet S. Then, the sheet S onto which the toner image has been fixed by the fixing unit 30 is discharged onto a discharge tray 36 by the discharge roller pair 35.

Sheet Width Regulation Unit

Figure 2:
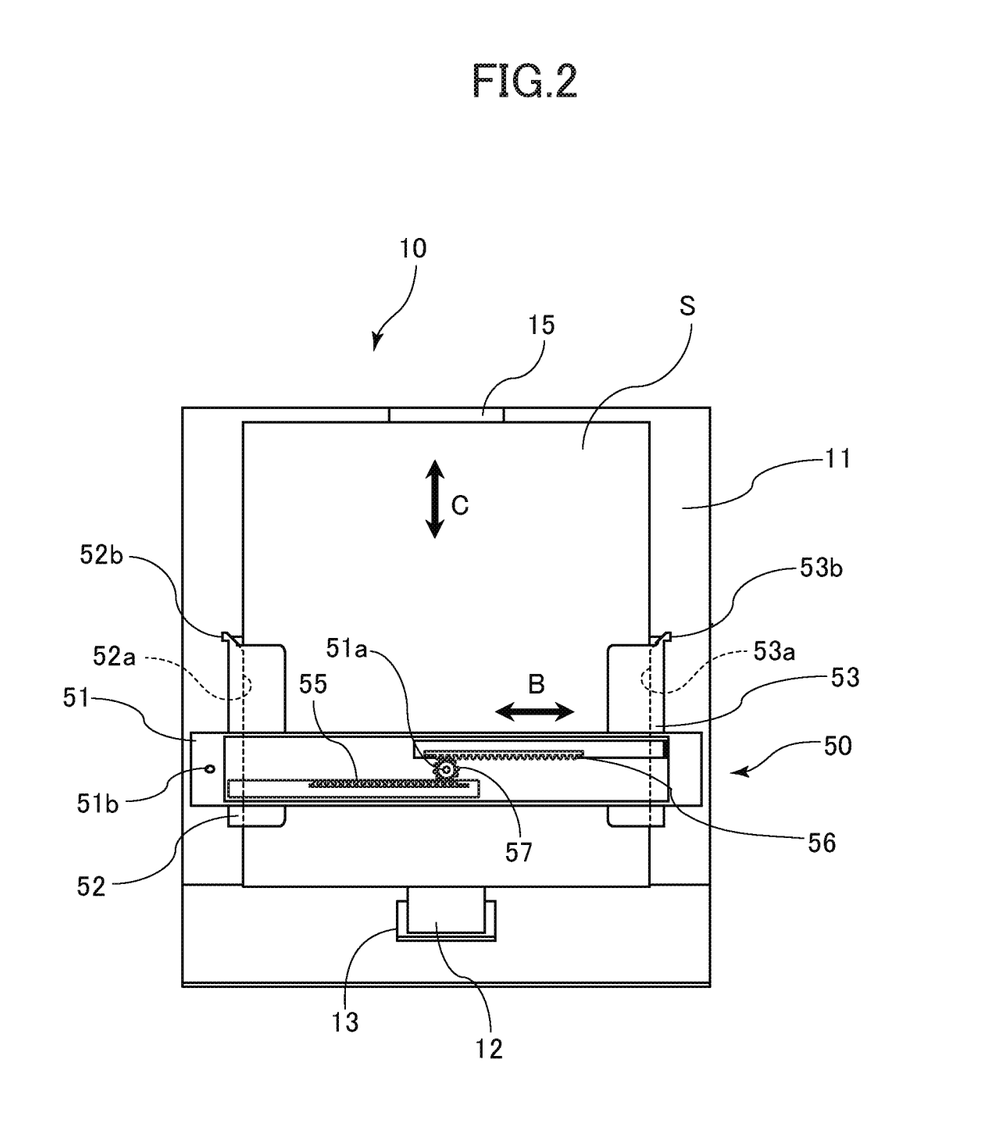
FIG. 2 is a plan view of a sheet feeding apparatus.

Next, a sheet width regulation unit 50 serving as a sheet regulation portion that regulates the position of the sheet S supported on the feed tray 11 serving as a sheet supporting portion in the width direction will be described with reference to FIGS. 1 and 2. As illustrated in FIG. 2, the feed tray 11 is an accommodating portion capable of accommodating a plurality of sheets of a plurality of sizes, and is configured to be compatible with sheets of a plurality of sizes. The sheet feeding apparatus 10 includes a sheet trailing end regulation portion 15 and a sheet width regulation unit 50 as a mechanism for determining the position of sheets placed on the feed tray 11.

The sheet trailing end regulation portion 15 is configured to be movable in a feeding direction C on the feed tray 11, and abuts a trailing end of the sheet S in the feeding direction C, which is a right end in FIG. 1, to regulate the position of the sheet S in the feeding direction C. In addition, the sheet width regulation unit 50 includes a first side regulation portion 52 and a second side regulation portion 53 respectively serving as first and second regulation members opposed to each other in a width direction B perpendicular to an up-down direction D and the feeding direction C of the sheet. The up-down direction corresponds to a gravity direction. The sheet width regulation unit 50 is configured to regulate the position of the sheet S in the width direction by the pair of side regulation portions 52 and 53.

Specifically, the first side regulation portion 52 includes a first contact surface 52a, a first operation portion 52b, and a first rack 55. The first contact surface 52a is capable of abutting a first end of the sheet S supported on the feed tray 11 in the width direction B, the first operation portion 52b is operated by a user to operate the first side regulation portion 52, and the first rack 55 is disposed along the width direction B. The first contact surface 52a abuts the first end of the sheet S supported on the feed tray 11 in the width direction B to regulate the position of the first end of the sheet S in the width direction B. The first end corresponds to a left end in FIG. 2.

In addition, the second side regulation portion 53 includes a second contact surface 53a, a second operation portion 53b, and a second rack 56. The second contact surface 53a is capable of abutting a second end of the sheet S supported on the feed tray 11 in the width direction B, which corresponds to a right end in FIG. 2, the second operation portion 53b is operated by a user to operate the second side regulation portion 53, and the second rack 56 is disposed along the width direction B. The second contact surface 53a is provided to oppose the first contact surface 52a, and abuts the second end of the sheet S supported on the feed tray 11 in the width direction B to regulate the position of the second end of the sheet S in the width direction B. The first rack 55 and the second rack 56 are respectively disposed at positions higher than the first contact surface 52a and the second contact surface 53a, and teeth of the first rack 55 and teeth of the second rack 56 oppose each other.

Further, a pinion 57 that engages with the first rack 55 and the second rack 56 is provided between the first rack 55 and the second rack 56. A pinion shaft 51a that is inserted in a cylindrical through hole 57a defined in the pinion 57 is formed in a width regulation holder 51 serving as a regulation member holding portion. The pinion shaft 51a serving as a projection portion is disposed approximately at a middle position between the first contact surface 52a and the second contact surface 53a in the width direction B, and functions as a rotation shaft that rotatably supports the pinion 57. Further, the width regulation holder 51 is provided with an unillustrated guide groove defined along the width direction B, and the width regulation holder 51 holds the first side regulation portion 52 and the second side regulation portion 53 in this guide groove such that the first side regulation portion 52 and the second side regulation portion 53 are slidable, that is, relatively movable in the width direction B. Therefore, when the user operates one of the first operation portion 52b and the second operation portion 53b to move the corresponding one of the first side regulation portion 52 and the second side regulation portion 53 toward one side in the width direction B, the other of the first side regulation portion 52 and the second side regulation portion 53 is moved toward the other side in the width direction B by rotation of the pinion 57. According to the sheet width regulation unit 50, the user can adjust the distance between the first contact surface 52a and the second contact surface 53a in accordance with the size of the sheet S supported on the feed tray 11 in the width direction B, by moving the first side regulation portion 52 and the second side regulation portion 53.

Attachment Structure of Laser Scanner

Figure 3:
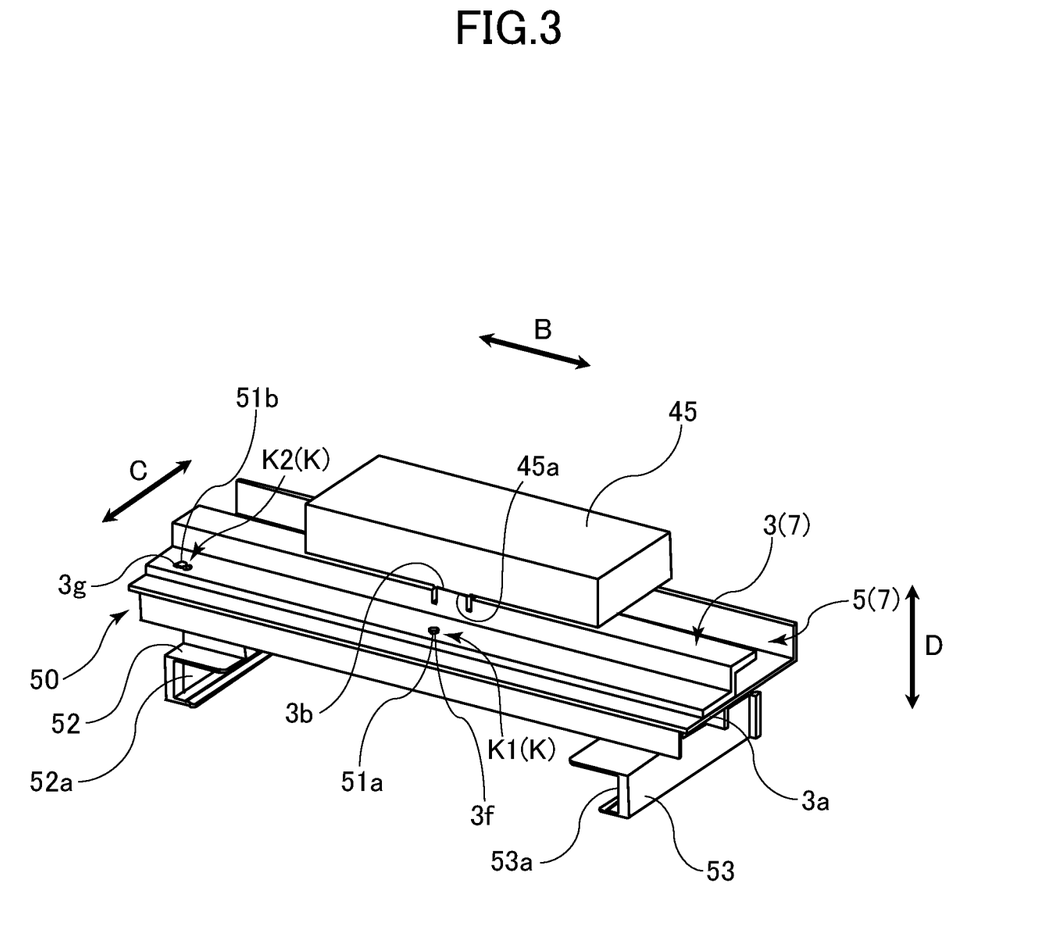
FIG. 3 is a perspective view of a laser scanner and a sheet width regulation unit illustrating an attachment structure thereof.

Next, an attachment structure of the laser scanner 45 according to the present embodiment will be described. As illustrated in FIGS. 1 and 3, in the present embodiment, a frame member 7 includes a scanner frame 3 serving as a first frame member and a reinforcing plate 5 serving as a second frame member. Ends of each of the scanner frame 3 and the reinforcing plate 5 in the width direction B are respectively coupled to side plates 2a of the printer body 2 on respective sides in the width direction B. Specifically, the laser scanner 45 is fixed to the scanner frame 3 via unillustrated fixing members such as screws in the printer body 2, and the scanner frame 3 is formed by bending a material having a high stiffness such as a metal plate. In addition, the scanner frame 3 is thicker than the reinforcing plate 5, and reduces vibration of the laser scanner 45 generated when forming an image on the sheet S. To be noted, the reinforcing plate 5 functions as a center stay, and as a result of the reinforcing plate 5 and the scanner frame 3 being provided to bridge the left and right side plates 2a, the strength of the printer body 2 is improved.

Figure 4:
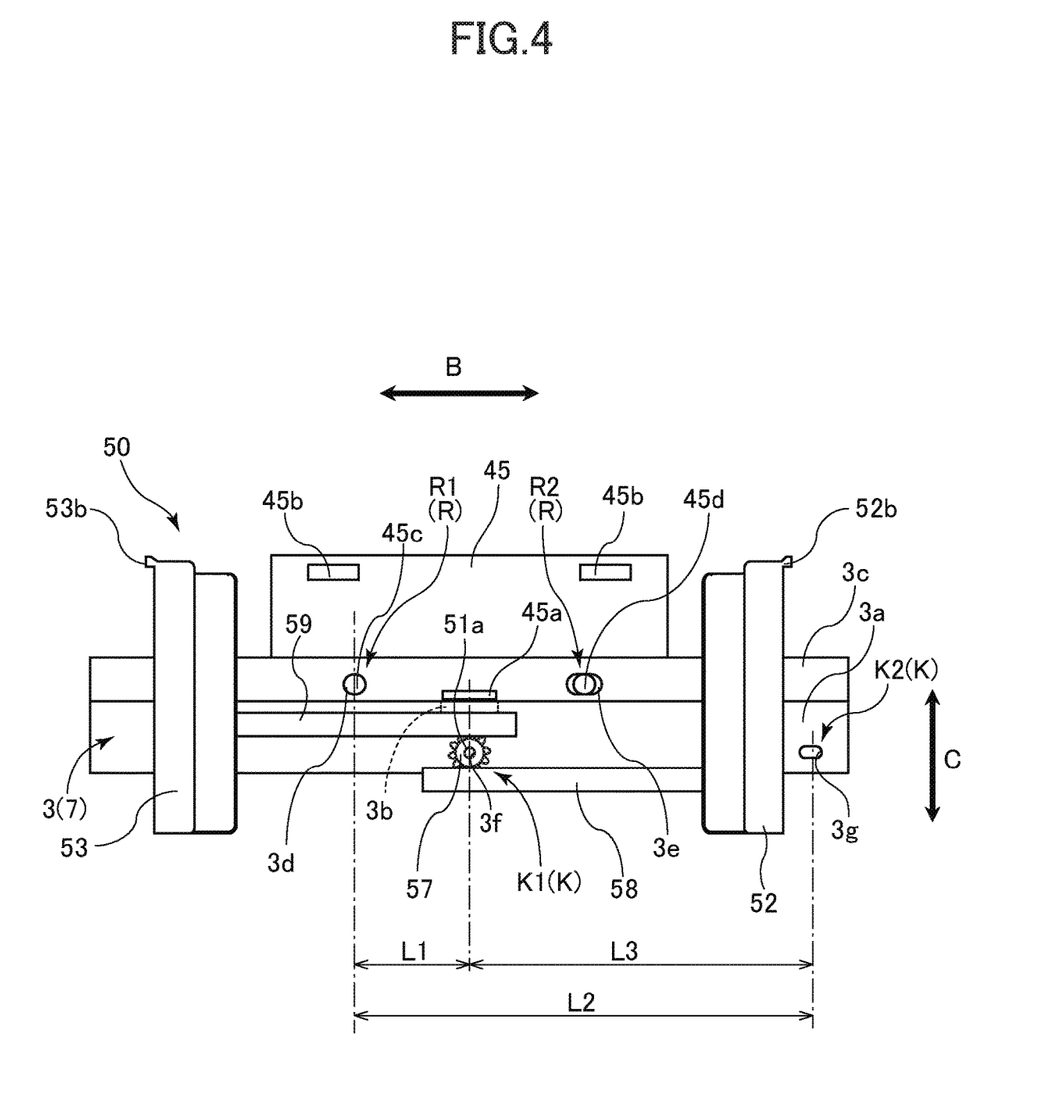
FIG. 4 is a bottom view of the laser scanner and the sheet width regulation unit illustrating the attachment structure thereof.

Further, as illustrated in FIG. 4, the scanner frame 3 is provided with a scanner positioning hole 3d having a cylindrical shape and defined along the gravity direction, and a scanner elongated hole 3e disposed at a position away from the scanner positioning hole 3d in the width direction B. The scanner elongated hole 3e is defined to have a shape longer in the width direction B than in the feeding direction C. Positioning bosses 45c and 45d are provided on the bottom surface of the laser scanner 45. The positioning boss 45c fits in the scanner positioning hole 3d, and the positioning boss 45d serving as a second projection portion fits in the scanner elongated hole 3e serving as a first elongated hole portion. As a result of this, the position of the laser scanner 45 in the width direction B and the feeding direction C serving as a front-rear direction is determined.

In addition, a plurality of projection portions 45a and 45b are provided on the bottom surface of the laser scanner 45. The projection portions 45a and 45b are each a projection portion projecting from the bottom surface of the laser scanner 45, and the projection portion 45a is positioned between the positioning bosses 45c and 45d in the width direction B. The scanner frame 3 is bent to have a cross-section of a crank shape as viewed in the width direction B, and a contact portion 3b that the projection portion 45a abuts is formed at a center portion of a step portion of the scanner frame 3 in the width direction B. The projection portion 45a abuts the contact portion 3b of the scanner frame 3. That is, the projection portion 45a serves as a scanner frame contact surface that abuts an upper surface of the scanner frame 3 in the gravity direction.

Further, the pair of projection portions 45b are provided with a predetermined interval therebetween in the width direction B further on the front side than the projection portion 45a, and the projection portion 45a is positioned between the pair of projection portions 45b in the width direction B. The reinforcing plate 5 is disposed below the scanner frame 3, and is bent upward on the front side of the scanner frame 3. The projection portions 45b are each configured to abut the upper surface of an end portion of a bent portion of the reinforcing plate 5. That is, the projection portions 45b serve as reinforcing plate contact surfaces that abut the upper surface of the reinforcing plate 5 in the gravity direction. As a result of the projection portions 45a and 45b abutting the corresponding surfaces, the position of the laser scanner 45 in the gravity direction is determined, and the inclination thereof with respect to the gravity direction is regulated.

As described above, in the present embodiment, the positioning boss 45c, serving as a first projection portion, and the scanner positioning hole 3d, serving as a first hole portion, constitute a first scanner positioning portion R1 serving as a first positioning portion. The first scanner positioning portion R1 determines the position of the laser scanner 45 with respect to the scanner frame 3 in the width direction B as a result of the positioning boss 45c fitting in the scanner positioning hole 3d.

In addition, in the present embodiment, the positioning boss 45d, serving as a second projection portion, and the scanner elongated hole 3e, serving as a first elongated hole portion, constitute a second scanner positioning portion R2 serving as a second positioning portion or a second exposing portion positioning portion. The second scanner positioning portion R2 is disposed at a position away from the first scanner positioning portion R1 in the width direction B. In the first scanner positioning portion R1 and the second scanner positioning portion R2, the positioning boss 45c is fitted in the scanner positioning hole 3d, and the positioning boss 45d is fitted in the scanner elongated hole 3e. As a result of this, the first scanner positioning portion 1 and the second scanner positioning portion R2 each determine the position of the laser scanner 45 in the feeding direction C with respect to the scanner frame 3, and also regulate the inclination of the laser scanner 45 with respect to the feeding direction C.

The first scanner positioning portion R1 and the second scanner positioning portion R2 constitute a scanner positioning mechanism R serving as a first positioning unit that determines the position of the laser scanner 45 with respect to the scanner frame 3 in the width direction B and the feeding direction C.

Attachment Structure of Sheet Width Regulation Unit

Next, an attachment structure of the sheet width regulation unit 50 will be described. As illustrated in FIGS. 1 and 3, in the sheet width regulation unit 50, the width regulation holder 51 is fixed to the scanner frame 3 by unillustrated fixing members such as screws. In addition, as illustrated in FIG. 4, the scanner frame 3 is provided with a regulation unit positioning hole 3f and a regulation unit elongated hole 3g each defined along the gravity direction D. The regulation unit positioning hole 3f has a cylindrical shape, and the regulation unit elongated hole 3g is longer in the width direction B than in the feeding direction C. The regulation unit positioning hole 3f serving as a hole portion or a second hole portion is disposed approximately at the center of the scanner frame 3 in the width direction B, and the pinion shaft 51a of the sheet width regulation unit 50 penetrating through the reinforcing plate 5 is fitted in the regulation unit positioning hole 3f. In addition, the regulation unit elongated hole 3g serving as a second elongated hole portion is disposed at one end portion of the scanner frame 3 in the width direction B, and the positioning boss 51b serving as a fourth projection portion of the sheet width regulation unit 50 penetrating through the reinforcing plate 5 is fitted in the regulation unit elongated hole 3g. The position of the sheet width regulation unit 50 in the gravity direction D with respect to the reinforcing plate 5 is determined as a result of the upper surface of the width regulation holder 51 abutting the bottom surface of the reinforcing plate 5.

In the present embodiment, the pinion shaft 51a and the regulation unit positioning hole 3f constitute a first regulation unit positioning portion K1 serving as a third positioning portion. The first regulation unit positioning portion K1 determines the position of the sheet width regulation unit 50 in the width direction B with respect to the scanner frame 3 as a result of the pinion shaft 51a fitting in the regulation unit positioning hole 3f.

In addition, as described above, the first side regulation portion 52 and the second side regulation portion 53 are interlocked via the pinion 57. Therefore, the precision of the middle position between the first contact surface 52a and the second contact surface 53a of the sheet width regulation unit 50 in the width direction B with respect to the scanner frame 3 is affected by the precision of the position of the pinion 57 in the width direction B with respect to the scanner frame 3. In the present embodiment, the pinion shaft 51a determining the position of the pinion 57 in the width direction B determines the position of the sheet width regulation unit 50 in the width direction B with respect to the scanner frame 3.

In addition, in the present embodiment, the positioning boss 51b and the regulation unit elongated hole 3g constitute a second regulation unit positioning portion K2 serving as a fourth positioning portion. The second regulation unit positioning portion K2 is disposed at a position away from the first regulation unit positioning portion K1 in the width direction B. The first regulation unit positioning portion K1 and the second regulation unit positioning portion K2 each determine the position of the sheet width regulation unit 50 in the feeding direction C with respect to the scanner frame 3, and also regulate the inclination of the sheet width regulation unit 50 with respect to the feeding direction C. The first regulation unit positioning portion K1 and the second regulation unit positioning portion K2 constitute a regulation unit positioning mechanism K serving as a second positioning unit of the present embodiment. The regulation unit positioning mechanism K determines the position of the sheet width regulation unit 50 in the width direction B and the feeding direction C with respect to the scanner frame 3, that is, the position of the sheet width regulation unit 50 in the width direction B and the feeding direction C with respect to the frame member 7.

The drawing start position precision of the laser of the laser scanner 45 is determined on the basis of the positioning boss 45c, and the position precision of the laser scanner 45 in the width direction B serves as the drawing start position precision of the image. In addition, the sheet width regulation unit 50, that is, the first contact surface 52a and the second contact surface 53a are provided symmetrically in the left-right direction with the pinion 57 at the middle point therebetween, and therefore, the position precision of the center of the pinion 57 in the width direction B serves as the position precision of the sheet S. Therefore, the relative position precision between the laser scanner 45 and the sheet width regulation unit 50 in the width direction B affects the drawing start position precision of the image.

In the present embodiment, the laser scanner 45 and the sheet width regulation unit 50 are arranged in the up-down direction such that the scanner frame 3 is interposed therebetween, and the positions of the laser scanner 45 and the sheet width regulation unit 50 are both determined in the width direction B with respect to the scanner frame 3. That is, by positioning both of the laser scanner 45 and the sheet width regulation unit 50 with respect to the same strong fixed member, the relative positional precision between the laser scanner 45 and the sheet width regulation unit 50 in the width direction B can be improved. Further, as a result of this, the drawing start position precision of an image on a sheet can be improved.

In addition, as described above, the pinion shaft 51a is provided approximately in the middle between the first contact surface 52a and the second contact surface 53a in the width direction B. The laser scanner 45 is disposed to overlap with the first regulation unit positioning portion K1 in the width direction B as viewed in the feeding direction C. Further, the laser scanner 45 is disposed such that the first regulation unit positioning portion K1 is positioned between the first scanner positioning portion R1 and the second scanner positioning portion R2 in the width direction B as viewed in the feeding direction C.

Further, as viewed in the feeding direction C, a distance L1 between the first scanner positioning portion R1 serving as a first positioning portion and the first regulation unit positioning portion K1 serving as a third positioning portion in the width direction B is smaller than a distance L2 between the first scanner positioning portion R1 serving as a first positioning portion and the second regulation unit positioning portion K2 serving as a fourth positioning portion in the width direction B. By disposing the first regulation unit positioning portion K1 at a position closer to the first scanner positioning portion R1 than the second regulation unit positioning portion K2 as described above, the precision of the positions of the laser scanner 45 and the sheet S supported on the feed tray 11 can be improved in the width direction B.

In addition, as viewed in the feeding direction C, the distance L1 between the first scanner positioning portion R1 and the first regulation unit positioning portion K1 in the width direction B is smaller than a distance L3 between the first regulation unit positioning portion K1 and the second regulation unit positioning portion K2 in the width direction B. Further, the second regulation unit positioning portion K2 is disposed at a position further on the outside than the laser scanner 45 on one side in the width direction B as viewed in the feeding direction C. By arranging the first regulation unit positioning portion K1 and the second regulation unit positioning portion K2 such that the distance L3 therebetween in the width direction B is large, the inclination of the sheet width regulation unit 50 with respect to the feeding direction C can be suppressed.

To be noted, although the sheet width regulation unit 50 is directly attached to the scanner frame 3 and positioning thereof in the gravity direction D is performed with respect to the reinforcing plate 5 in the embodiment described above, the configuration is not limited to this. For example, the reinforcing plate 5 and the scanner frame 3 may position each other or be integrally coupled to each other to position the sheet width regulation unit 50 with respect to the reinforcing plate 5, or the positioning of the sheet width regulation unit 50 in the gravity direction D may be performed with respect to the scanner frame 3.

In addition, although the position of the sheet width regulation unit 50 in the width direction B with respect to the scanner frame 3 is determined by the pinion shaft 51a and the regulation unit positioning hole 3f of the scanner frame 3, the configuration is not limited to this. Any configuration can be employed as long as positioning of the scanner frame and the sheet width regulation unit is performed in the width direction B. For example, the position of the sheet width regulation unit in the width direction may be determined by a positioning boss provided on the sheet width regulation unit separately from the pinion shaft and a positioning hole of the scanner frame. In addition, for example, the position of the sheet width regulation unit in the width direction may be determined by a positioning hole of the scanner frame and a projection portion integrally formed with the pinion at an upper end of the pinion.

In addition, although the scanner positioning mechanism R is constituted by the first scanner positioning portion R1 and the second scanner positioning portion R2 constituted by bosses formed on the laser scanner 45 and holes defined in the scanner frame 3 in the present embodiment, the configuration is not limited to this. The first positioning unit may be in any form as long as the first positioning unit is a mechanism that determines the position of an exposing portion that exposes the surface of a charged image bearing member to form an electrostatic latent image, with respect to the frame member. For example, the first positioning unit may include a boss provided on one of the exposing portion and the frame member, a hole provided in the other of the exposing portion and the frame member, and a contact portion that regulates the inclination of the exposing portion with respect to the frame member in the feeding direction.

In addition, although the sheet width regulation unit 50 includes the first side regulation portion 52 and the second side regulation portion 53 that are interlocked via the pinion 57 and regulate the position of the sheet S supported on the feed tray 11, the configuration is not limited to this. Any sheet regulation portion may be employed as long as the sheet regulation portion is capable of regulating the position of the sheet supported on the sheet supporting portion in the width direction. For example, a configuration in which the sheet regulation portion includes a first regulation member that regulates the position of one end of the sheet in the width direction and a second regulation member that regulates the position of the other end of the sheet, and only one of the first regulation member and the second regulation member is movable in the width direction may be employed.

Second Embodiment

Next, a second embodiment will be described with reference to FIG. 5 in addition to FIG. 1. A printer 201 of the present embodiment is different from the first embodiment described above in the mechanism for positioning the sheet width regulation unit 50 with respect to the scanner frame 3, but other elements and effects thereof are the same as in the first embodiment. In the description below, the same elements as in the first embodiment will be denoted by the same reference signs or given the same names, description and illustration thereof will be omitted or simplified, and parts different from the first embodiment will be mainly described.

Figure 5:
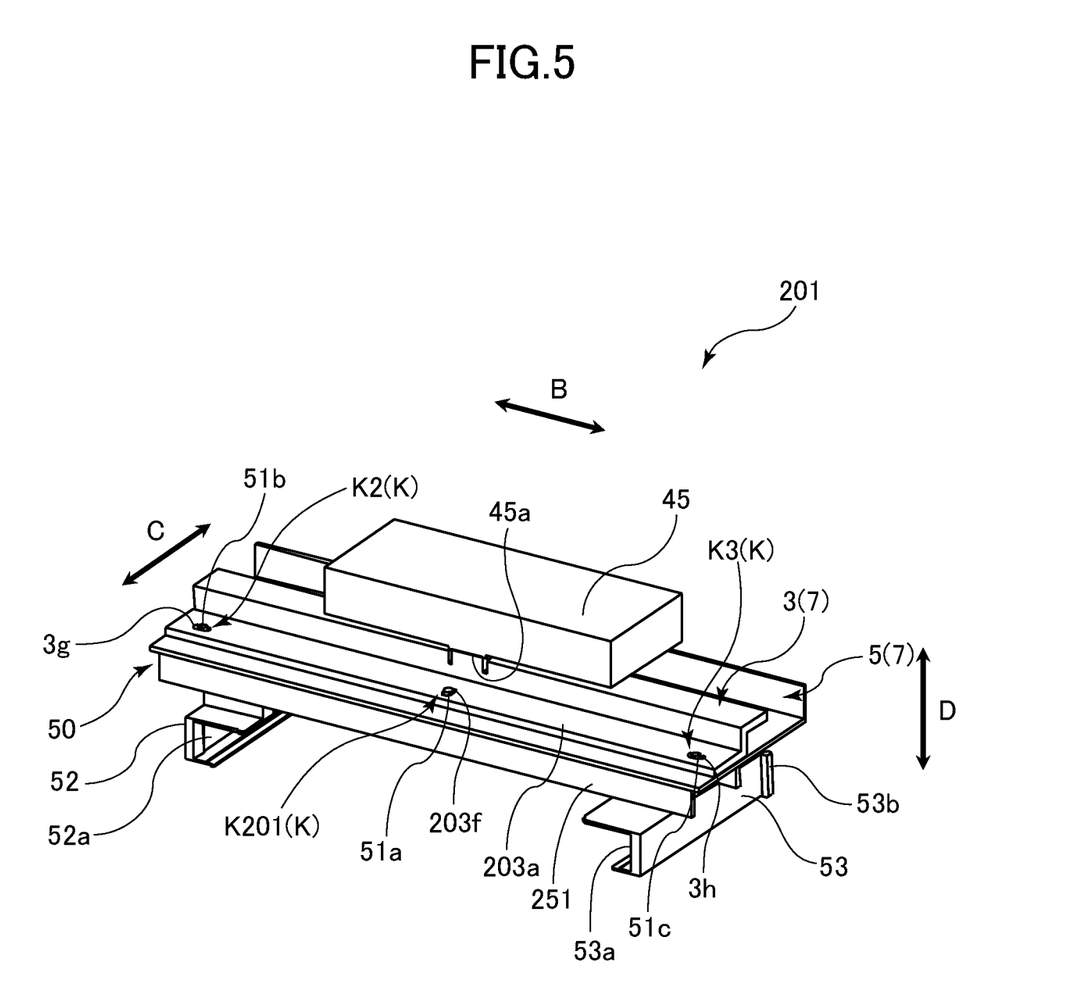
FIG. 5 is a perspective view of a laser scanner and a sheet width regulation unit according to a second embodiment illustrating an attachment structure thereof.

As illustrated in FIG. 5, the scanner frame 3 of the present embodiment is provided with a regulation unit positioning hole 203f and regulation unit elongated holes 3g and 3h. The regulation unit positioning hole 203f is defined along the gravity direction D and is longer in the feeding direction C than in the width direction B. The regulation unit elongated holes 3g and 3h are each defined along the gravity direction D and are each longer in the width direction B than in the feeding direction C. The regulation unit positioning hole 203f serving as a hole portion or a second hole portion is provided at approximately the center of the scanner frame 3 in the width direction B, and the pinion shaft 51a of the sheet width regulation unit 50 penetrating through the reinforcing plate 5 is fitted in the regulation unit positioning hole 203f.

The regulation unit elongated hole 3g is disposed at one end portion of the scanner frame 3 in the width direction B, and the positioning boss 51b of the sheet width regulation unit 50 penetrating through the reinforcing plate 5 is fitted in the regulation unit elongated hole 3g. The regulation unit elongated hole 3h is disposed at an end portion of the scanner frame 3 in the width direction B opposite to the regulation unit elongated hole 3g, and a positioning boss 51c of the sheet width regulation unit 50 penetrating through the reinforcing plate 5 is fitted in the regulation unit elongated hole 3h.

In the present embodiment, the pinion shaft 51a, serving as a third projection, and the regulation unit positioning hole 203f, serving as a second hole portion, constitute a first regulation unit positioning portion K201 serving as a third positioning portion. The first regulation unit positioning portion K201 determines the position of the sheet width regulation unit 50 with respect to the scanner frame 3 in the width direction B as a result of the pinion shaft 51a fitting in the regulation unit positioning hole 203f. In addition, the positioning boss 51b is fitted in the regulation unit elongated hole 3g of the scanner frame 3, and the positioning boss 51c is fitted in the regulation unit elongated hole 3h of the scanner frame 3.

In the present embodiment, the positioning boss 51b, serving as a fourth projection, and the regulation unit elongated hole 3g, serving as a second elongated hole, constitute the second regulation unit positioning portion K2 serving as a fourth positioning portion. In addition, the positioning boss 51c and the regulation unit elongated hole 3h constitute a third regulation unit positioning portion K3 serving as a fifth positioning portion. The second regulation unit positioning portion K2 and the third regulation unit positioning portion K3 are disposed at positions away from each other in the width direction B. In addition, the third regulation unit positioning portion K3 is disposed on the opposite side to the second regulation unit positioning portion K2 with respect to the first regulation unit positioning portion K201 in the width direction B.

The second regulation unit positioning portion K2 and the third regulation unit positioning portion K3 each determine the position of the sheet width regulation unit 50 in the feeding direction C with respect to the scanner frame 3. In addition, the second regulation unit positioning portion K2 and the third regulation unit positioning portion K3 regulate the inclination of the sheet width regulation unit 50 with respect to the feeding direction C. The first regulation unit positioning portion K201, the second regulation unit positioning portion K2, and the third regulation unit positioning portion K3 constitute a regulation unit positioning mechanism K serving as a second positioning unit. The regulation unit positioning mechanism K determines the position of the sheet width regulation unit 50 in the width direction B and the feeding direction C with respect to the scanner frame 3, that is, the position of the sheet width regulation unit 50 in the width direction B and the feeding direction C with respect to the frame member 7.

According to the present embodiment described above, as compared with the first embodiment described above, the distance between the second regulation unit positioning portion K2 and the third regulation unit positioning portion K3, which regulate the inclination of the sheet width regulation unit 50 with respect to the feeding direction C, in the width direction B can be increased. As a result of this, inclination of the sheet width regulation unit 50 with respect to the feeding direction C can be suppressed.

Third Embodiment

Next, a third embodiment will be described with reference to FIGS. 6 and 7 in addition to FIG. 1. A printer 301 of the present embodiment is different from the first embodiment described above in the mechanism for positioning the sheet width regulation unit 50 with respect to the scanner frame 3, but other elements and effects thereof are the same as in the first embodiment. In the description below, the same elements as in the first embodiment will be denoted by the same reference signs or given the same names, description and illustration thereof will be omitted or simplified, and parts different from the first embodiment will be mainly described.

Figure 6:
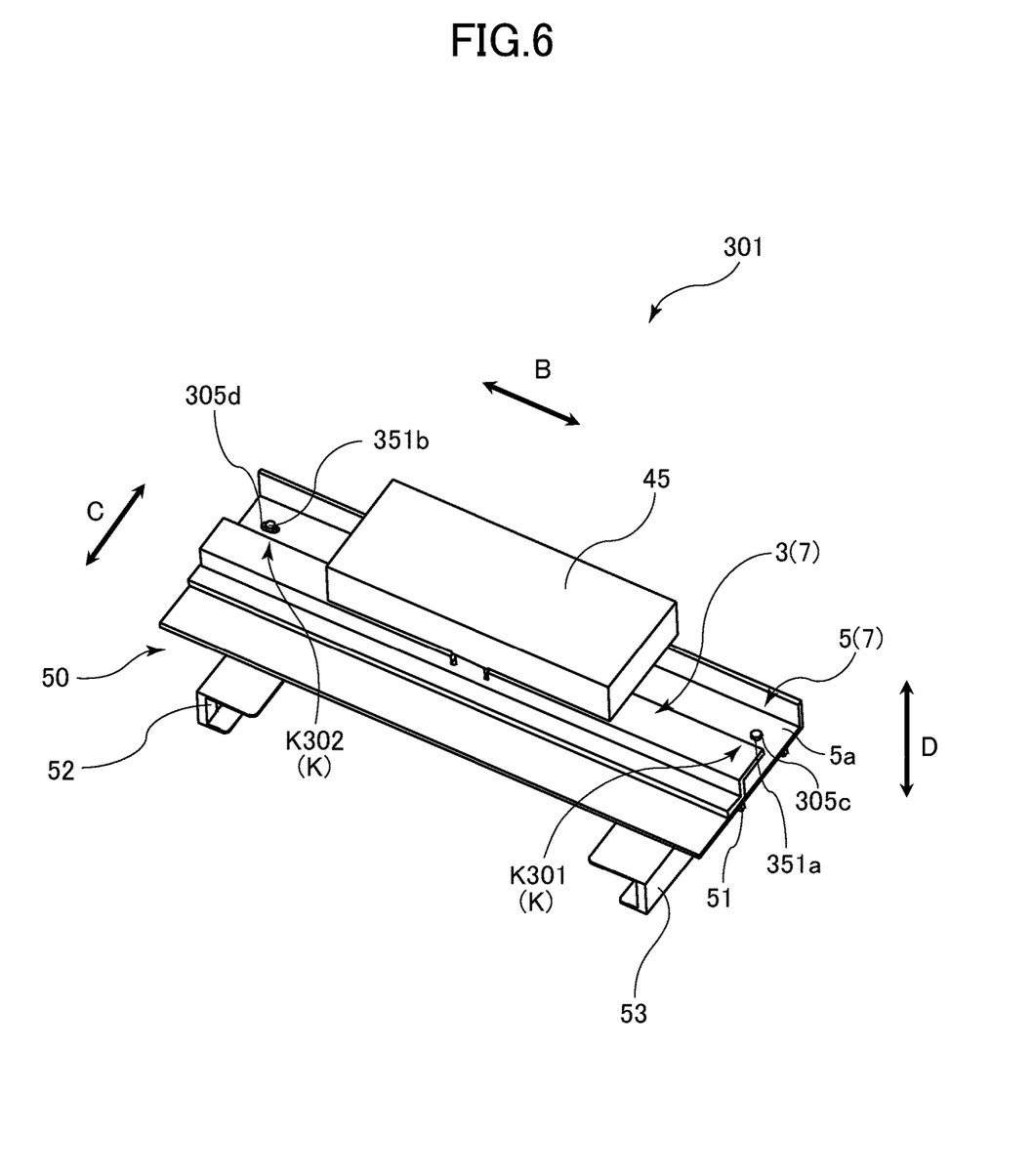
FIG. 6 is a perspective view of a laser scanner and a sheet width regulation unit according to a third embodiment illustrating an attachment structure thereof.
Figure 7:
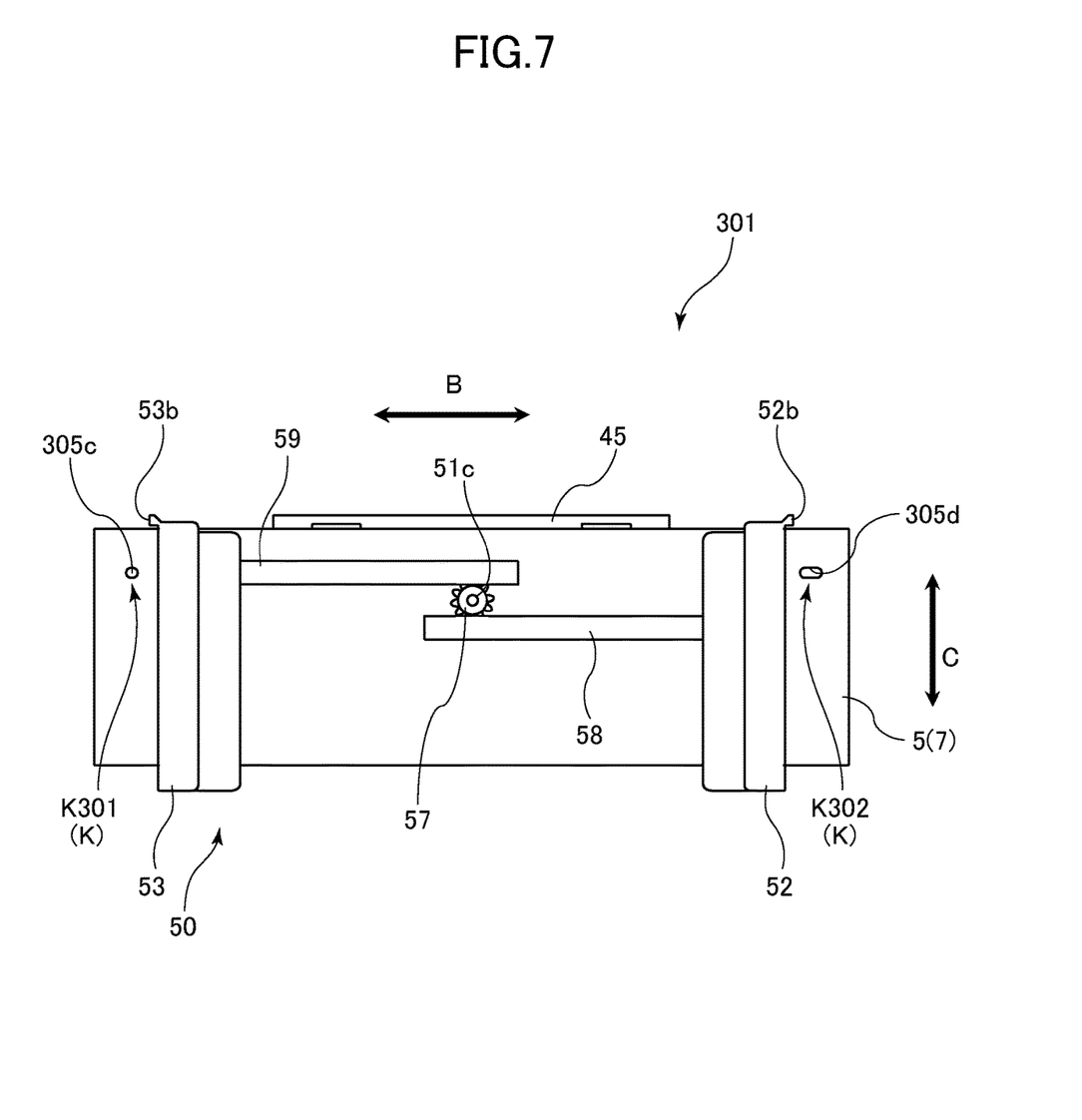
FIG. 7 is a bottom view of the laser scanner and the sheet width regulation unit according to the third embodiment illustrating the attachment structure thereof.

As illustrated in FIGS. 6 and 7, the position of the reinforcing plate 5 in the feeding direction C, the width direction B, and the gravity direction D is determined with respect to the scanner frame 3, and the scanner frame 3 and the reinforcing plate 5 are integrally assembled. The reinforcing plate 5 is formed by bending a material having a high stiffness, for example, a metal plate, and the width regulation holder 51 is fixed thereto by unillustrated fixing members such as screws. In addition, the reinforcing plate 5 is provided with a regulation unit positioning hole 305c having a cylindrical shape and a regulation unit elongated hole 305d longer in the width direction B than in the feeding direction C that are each defined along the gravity direction D.

The regulation unit positioning hole 305c serving as a hole portion is provided at one end portion of the reinforcing plate 5 in the width direction B, and a first positioning boss 351a serving as a projection portion or a third projection portion and formed on the width regulation holder 51 is fitted in the regulation unit positioning hole 305c. The regulation unit elongated hole 305d serving as a second elongated hole portion is provided at an end portion of the reinforcing plate 5 in the width direction B opposite to the regulation unit positioning hole 305c, and a second positioning boss 351b formed on the width regulation holder 51 and serving as a fourth projection portion is fitted in the regulation unit elongated hole 305d. The regulation unit elongated hole 305d is preferably positioned further on the outside than the laser scanner 45 on one side in the width direction B as viewed in the feeding direction C. In addition, the regulation unit positioning hole 305c is preferably positioned further on the outside than the laser scanner 45 on one side in the width direction B as viewed in the feeding direction C.

In the present embodiment, the first positioning boss 351a and the regulation unit positioning hole 305c constitute a first regulation unit positioning portion K301 serving as a third positioning portion that determines the position of the sheet width regulation unit 50 in the width direction B with respect to the frame member 7. The first regulation unit positioning portion K301 determines the position of the sheet width regulation unit 50 in the width direction B with respect to the reinforcing plate 5 as a result of the first positioning boss 351a fitting in the regulation unit positioning hole 305c.

In addition, in the present embodiment, the second positioning boss 351b and the regulation unit elongated hole 305d constitute a second regulation unit positioning portion K302 serving as a fourth positioning portion. The second regulation unit positioning portion K302 is provided at a position different from the first regulation unit positioning portion K301 serving as a third positioning portion described above in the width direction B. The first regulation unit positioning portion K301 and the second regulation unit positioning portion K302 each determine the position of the sheet width regulation unit 50 in the feeding direction C with respect to the reinforcing plate 5. In addition, the first regulation unit positioning portion K301 and the second regulation unit positioning portion K302 regulate the inclination of the sheet width regulation unit 50 with respect to the feeding direction C.

The first regulation unit positioning portion K301 and the second regulation unit positioning portion K302 constitute the regulation unit positioning mechanism K serving as a second positioning unit of the present embodiment. The regulation unit positioning mechanism K determines the position of the sheet width regulation unit 50 in the width direction B and the feeding direction C with respect to the reinforcing plate 5, that is, the position of the sheet width regulation unit 50 in the width direction B and the feeding direction C with respect to the frame member 7.

According to the present embodiment described above, a positioning hole for the sheet width regulation unit 50 does not have to be provided in the scanner frame 3, and therefore the pinion 57 does not have to be provided in correspondence with the positioning hole. Therefore, the flexibility of the position of the pinion 57 in the feeding direction C can be improved. As a result of this, for example, in the feeding direction C, the pinion 57 can be disposed in the vicinity of the first operation portion 52b and the second operation portion 53b to suppress deformation of the first side regulation portion 52 and the second side regulation portion 53 at the time of operating the first side regulation portion 52 and the second side regulation portion 53 and thus improve the operability. In addition, the pinion 57 is preferably provided between the regulation unit positioning hole 305c and the regulation unit elongated hole 305d.

In addition, according to the present embodiment, the first positioning boss 351a can be disposed irrespective of the position of the pinion 57. Therefore, as compared with the first embodiment, the distance between the first regulation unit positioning portion K301 and the second regulation unit positioning portion K302, which regulate the inclination of the sheet width regulation unit 50 with respect to the feeding direction C, in the width direction B can be increased. As a result of this, the inclination of the sheet width regulation unit 50 with respect to the feeding direction C can be suppressed.

To be noted, although the scanner frame 3 and the reinforcing plate 5 are each attached to side plates of the printer body and the positions thereof in the feeding direction, the width direction, and the gravity direction with respect to each other are determined by an unillustrated positioning mechanism in the present embodiment, the configuration is not limited to this. Any configuration can be employed as long as the scanner frame and the reinforcing plate are positioned with respect to each other at least in the width direction and capable of positioning the laser scanner and the sheet width regulation unit. For example, a configuration in which only one of the scanner frame and the reinforcing plate is attached to side plates of the printer body may be employed. Specifically, a configuration in which only the reinforcing plate among the scanner frame and the reinforcing plate is attached to the side plates and the scanner frame and the laser scanner are unitized, positioned with respect to the reinforcing plate, and attached to the reinforcing plate may be employed. In addition, the scanner frame and the reinforcing plate may be fixed to each other by welding, using screws, or the like, or may be integrally formed as a single part.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-166461, filed Sep. 12, 2019, which is hereby incorporated by reference herein in its entirety.

What is claimed is:

1. An image forming apparatus comprising:
a sheet supporting portion configured to support a sheet thereon;
a sheet feeding portion configured to feed the sheet supported on the sheet supporting portion;
a sheet regulation portion configured to regulate a position of the sheet supported on the sheet supporting portion in a width direction perpendicular to a feeding direction in which the sheet is fed;
an image forming portion comprising an image bearing member configured to rotate, a charging portion configured to charge a surface of the image bearing member, an exposing portion configured to expose the charged surface of the image bearing member to form an electrostatic latent image, and a developing portion configured to develop the electrostatic latent image formed on the image bearing member with toner, the image forming portion being configured to form an image on the sheet fed by the sheet feeding portion;
an apparatus body including
a first side frame located on an outside of a first end of the image forming portion in the width direction, and
a second side frame located on an outside of a second end of the image forming portion in the width direction; and
a frame member connected to the first side frame and the second side frame,
wherein the frame member includes an exposing portion positioning portion configured to determine the position of the exposing portion with respect to the frame member and a sheet regulation portion positioning portion configured to determine the position of the sheet regulation portion with respect to the frame member.

2. The image forming apparatus according to claim 1, wherein
the exposing portion positioning portion comprises a first positioning portion configured to determine the position of the exposing portion in the width direction with respect to the frame member.

3. The image forming apparatus according to claim 2,
wherein the exposing portion positioning portion comprises a second positioning portion provided at a different position from the first positioning portion in the width direction and configured to determine the position of the exposing portion in the feeding direction with respect to the frame member,
wherein the sheet regulation portion positioning portion comprises a third positioning portion configured to determine the position of the sheet regulation portion in the width direction with respect to the frame member, and a fourth positioning portion provided at a different position from the third positioning portion in the width direction and configured to determine the position of the sheet regulation portion in the feeding direction with respect to the frame member, and
wherein a distance between the first positioning portion and the third positioning portion in the width direction is smaller than a distance between the third positioning portion and the second positioning portion in the width direction.

4. The image forming apparatus according to claim 3,
wherein the sheet regulation portion positioning portion comprises a fifth positioning portion provided at a different position from the fourth positioning portion in the width direction and configured to determine the position of the sheet regulation portion in the feeding direction with respect to the frame member together with the fourth positioning portion, and
wherein the fifth positioning portion is provided at a position on a side opposite to the fourth positioning portion in the width direction with respect to the third positioning portion.

5. The image forming apparatus according to claim 3, wherein the fourth positioning portion is positioned further on an outside than the exposing portion on one side in the width direction.

6. The image forming apparatus according to claim 5, wherein the third positioning portion is positioned further on the outside than the exposing portion on another side in the width direction.

7. The image forming apparatus according to claim 3, wherein the third positioning portion is positioned between the first positioning portion and the second positioning portion in the width direction as viewed in the feeding direction.

8. The image forming apparatus according to claim 3, wherein the distance between the first positioning portion and the third positioning portion in the width direction is smaller than a distance between the first positioning portion and the fourth positioning portion in the width direction.

9. The image forming apparatus according to claim 3, wherein the sheet regulation portion comprises:
a first regulation member comprising a first rack disposed along the width direction, the first regulation member being configured to regulate a position of a first end of the sheet supported on the sheet supporting portion, the first end being an end of the sheet in the width direction;
a second regulation member comprising a second rack disposed along the width direction, the second regulation member being configured to regulate a position of a second end of the sheet supported on the sheet supporting portion, the second end being another end of the sheet in the width direction;
a regulation member holding portion configured to hold the first regulation member and the second regulation member relatively movably in the width direction; and
a pinion configured to engage with the first rack and the second rack and rotate to move the first regulation member and the second regulation member toward opposite sides in the width direction.

10. The image forming apparatus according to claim 9, wherein the third positioning portion comprises a hole portion defined in the frame member, and a projection portion provided on the sheet regulation portion and configured to fit in the hole portion, and the projection portion fits in the hole portion to determine the position of the sheet regulation portion in the width direction with respect to the frame member.

11. The image forming apparatus according to claim 10, wherein the projection portion functions as a rotation shaft of the pinion.

12. The image forming apparatus according to claim 3,
wherein the first positioning portion comprises a first projection portion provided on one of the exposing portion and the frame member, and a first hole portion provided in another of the exposing portion and the frame member, and the first projection portion and the first hole portion engage with each other to determine the position of the exposing portion with respect to the frame member,
wherein the second positioning portion comprises a second projection portion provided on one of the exposing portion and the frame member, and a first elongated hole portion longer in the width direction and provided in another of the exposing portion and the frame member, and the second projection portion and the first elongated hole portion engage with each other to determine the position of the exposing portion with respect to the frame member,
wherein the third positioning portion comprises a third projection portion provided on one of the sheet regulation portion and the frame member, and a second hole portion provided in another of the sheet regulation portion and the frame member, and the third projection portion and the second hole portion engage with each other to determine the position of the sheet regulation portion with respect to the frame member, and
wherein the fourth positioning portion comprises a fourth projection portion provided on one of the sheet regulation portion and the frame member, and a second elongated hole portion longer in the width direction and provided in another of the sheet regulation portion and the frame member, and the fourth projection portion and the second elongated hole portion engage with each other to determine the position of the sheet regulation portion with respect to the frame member.

13. The image forming apparatus according to claim 1,
wherein the frame member comprises a first frame member and a second frame member,
wherein at least a position of the second frame member in the width direction is determined with respect to the first frame member,
wherein the position of the exposing portion is determined with respect to the first frame member, and
wherein the position of the sheet regulation portion is determined with respect to the second frame member.

* * * * *